(12) United States Patent
Wang

(10) Patent No.: US 10,901,925 B2
(45) Date of Patent: *Jan. 26, 2021

(54) CONFIGURABLE INPUT / OUTPUT CONNECTOR IN A CAMERA

(71) Applicant: GoPro, Inc., San Mateo, CA (US)

(72) Inventor: Yu Wang, San Jose, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,644

(22) Filed: Dec. 16, 2019

(65) Prior Publication Data
US 2020/0192837 A1 Jun. 18, 2020

Related U.S. Application Data

(63) Continuation of application No. 16/199,934, filed on Nov. 26, 2018, now Pat. No. 10,509,745, which is a continuation of application No. 14/885,990, filed on Oct. 16, 2015, now Pat. No. 10,169,265.

(51) Int. Cl.
*G06F 13/20* (2006.01)
*G06F 13/42* (2006.01)
*G06F 13/40* (2006.01)

(52) U.S. Cl.
CPC .......... *G06F 13/20* (2013.01); *G06F 13/4068* (2013.01); *G06F 13/4282* (2013.01); *G06F 2213/0042* (2013.01)

(58) Field of Classification Search
CPC ..... G06F 2212/2146; G06F 2213/0016; G06F 2213/0042
See application file for complete search history.

(56) References Cited

U.S. PATENT DOCUMENTS

| 9,467,731 B2 | 10/2016 | Zhang | |
|---|---|---|---|
| 2006/0123182 A1* | 6/2006 | Sandulescu | G06F 3/023 710/316 |
| 2007/0050378 A1* | 3/2007 | Kasatani | G06Q 10/10 |

(Continued)

OTHER PUBLICATIONS

USB 3.0 Promoter Group, "Universal Serial Bus Type-C Cable and Connector Specification," Release 1.1, Apr. 3, 2015, 180 Pages.

*Primary Examiner* — Getente A Yimer
(74) *Attorney, Agent, or Firm* — Young Basile Hanlon & MacFarlane, P.C.

(57) ABSTRACT

A method and system for configuring a USB3 input/output port in a camera are disclosed. The method comprises responsive to an indication that a peripheral device is a non-USB3 device, remapping pins of the USB3 input/output port to a first predefined port configuration associated with an I2C protocol by remapping a RX1− pin to communicate a first I2C signal and remapping a RX1+ pin to communicate a second I2C signal, and responsive to successful authentication between the camera and the peripheral device via the I2C protocol, enabling communication with the peripheral device and remapping the pins of the USB3 input/output port to a second predefined port configuration compatible with operation of the authenticated peripheral device by remapping a TX2+ pin to communicate a first general purpose input/output signal and remapping a TX2− pin to communicate a second general purpose input/output signal.

20 Claims, 5 Drawing Sheets

(56) References Cited

U.S. PATENT DOCUMENTS

| | | | |
|---|---|---|---|
| 2010/0109795 A1* | 5/2010 | Jones | H04L 12/40006 333/101 |
| 2013/0282938 A1* | 10/2013 | Huang | H04W 4/00 710/106 |
| 2014/0355986 A1 | 12/2014 | Trojer | |
| 2015/0207521 A1 | 7/2015 | Waters | |
| 2016/0309590 A1 | 10/2016 | Ding | |
| 2017/0052578 A1* | 2/2017 | Agarwal | G06F 13/4282 |

* cited by examiner

CONFIGURABLE INPUT / OUTPUT CONNECTOR IN A CAMERA

CROSS-REFERENCE TO RELATED APPLICATION(S)

This application is a continuation of U.S. application patent Ser. No. 16/199,934, filed Nov. 26, 2018, which is a continuation of U.S. application patent Ser. No. 14/885,990, filed Oct. 16, 2015, now U.S. Pat. No. 10,169,265, the entire disclosures of which are hereby incorporated by reference.

BACKGROUND

Field of the Disclosure

This disclosure generally relates to connectors, and more specifically to a configurable input/output connector in a camera.

Description of the Related Art

A camera for capturing images and/or videos can be connected to various peripheral devices, such as camera accessories. The camera and the peripheral devices traditionally may be designed to communicate using different protocols and over various input/output connector ports on the camera. However, each port on the camera may undesirably constrain the physical form factor of the camera as well as constrain internal electronic characteristics of the camera in order to accommodate the multiple ports and protocols to connect and communicate with the peripheral devices.

BRIEF DESCRIPTION OF THE DRAWINGS

The teachings of the embodiments disclosed herein can be readily understood by considering the following detailed description in conjunction with the accompanying drawings.

DETAILED DESCRIPTION

The FIGS. and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A camera includes, among other components, an input/output system and one or more input/output ports. The camera configures the input/output port according to a default pin configuration. The camera detects a peripheral device is connected to the camera via the input/output ports. The camera receives an identifier from the peripheral device indicating whether the peripheral device is a USB3 device or a non-USB3 device. If the peripheral device is a USB3 device, the camera communicates with the peripheral device via the USB3 protocol. If the peripheral device is not a USB3 device, the camera remaps the pins of the input/output port to a first predefined configuration associated with an I2C protocol. The camera authenticates with the peripheral device via the I2C protocol to determine if the peripheral device meets a criteria for an approved device. If the authentication is successful, the camera enables communication with the peripheral device and remaps the pins of the input/output port to a second predefined configuration. If the authentication is unsuccessful, the camera disables communication with the peripheral device and remaps the pins of the input/output port to the default configuration.

Figure 1:
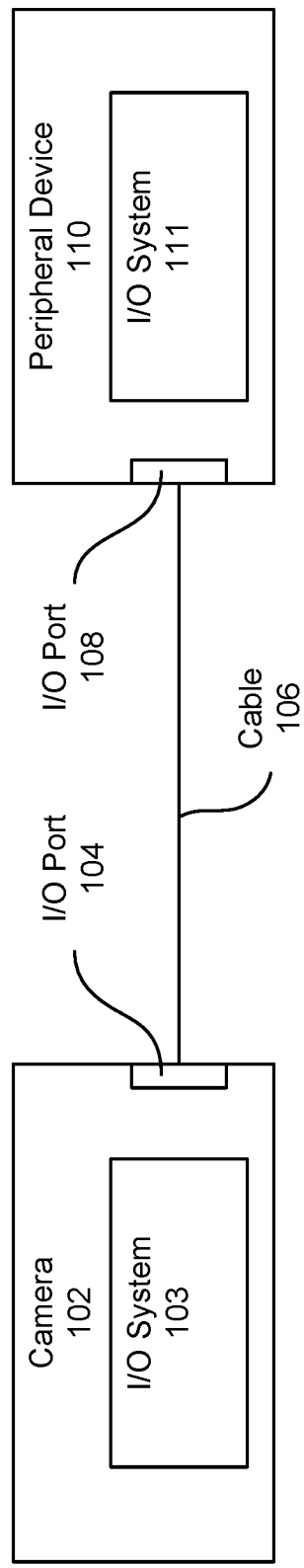
FIG. 1 is a block diagram illustrating a camera and a peripheral device, according to one example.

FIG. 1 is a block diagram illustrating a camera 102 and a peripheral device 110. The camera 102 includes an input/output system 103 (hereinafter referred to as "I/O system 103") and an input/output interface port 104 (hereinafter referred to as "I/O port 104") and the peripheral device 110 includes an input/output system 111 (hereinafter referred to as "I/O system 111") and an input/output interface port 108 (hereinafter referred to as "I/O port 108"). A cable 106 connects the I/O port 104 of the camera 102 to the I/O port 108 of the peripheral device 110. The cable 106 enables the camera 102 and the peripheral device 110 to communicate with one another. In one embodiment, the peripheral device 110 is an accessory to the camera 102 that provides enhanced functionality such as multi-camera synchronization, wireless connectivity, telemetry data collection and processing, audio data collection and processing, external battery capacity, etc.

Figure 2A:
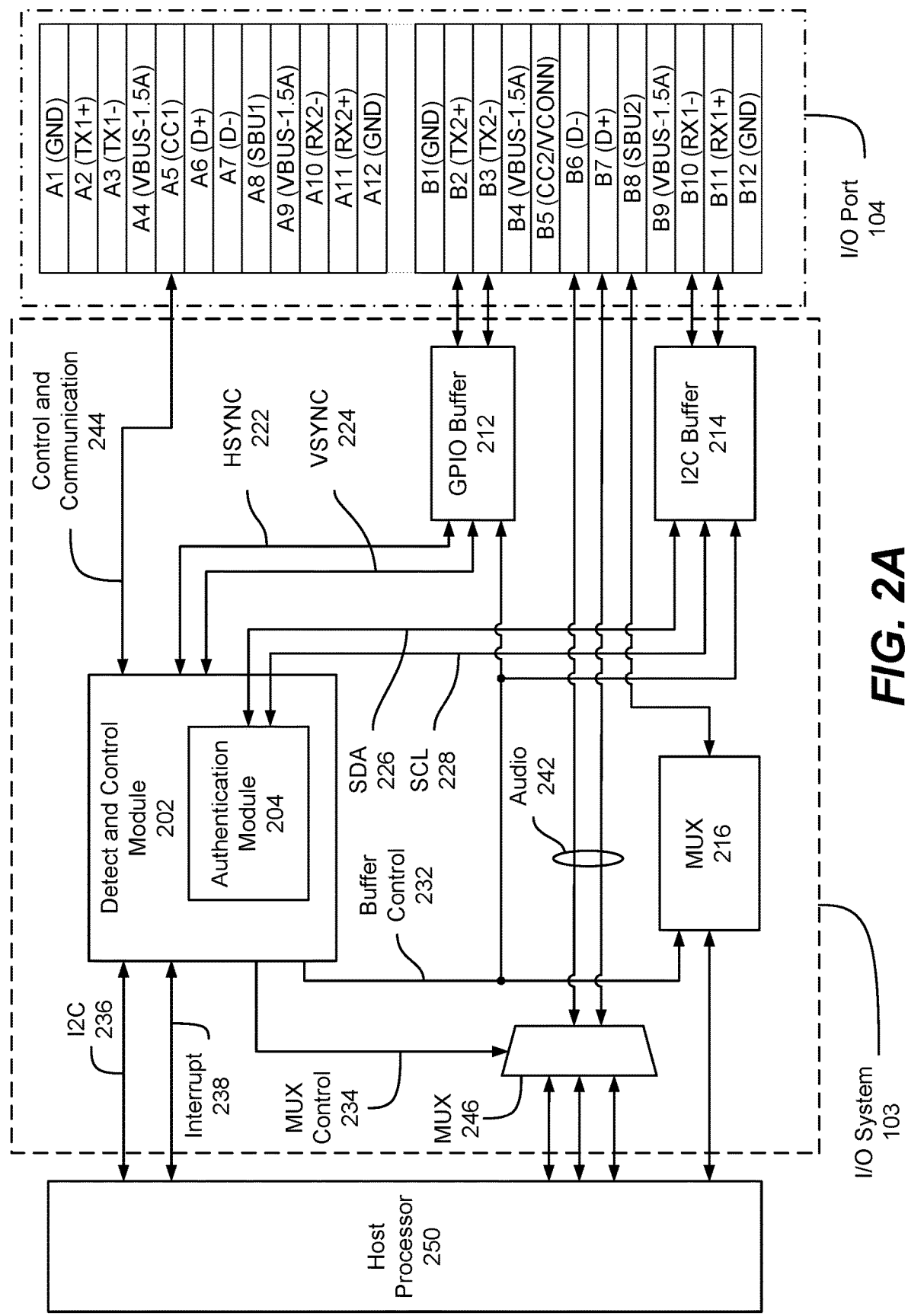
FIG. 2A is a block diagram illustrating an input/output system of a camera, according to one embodiment.
Figure 2B:
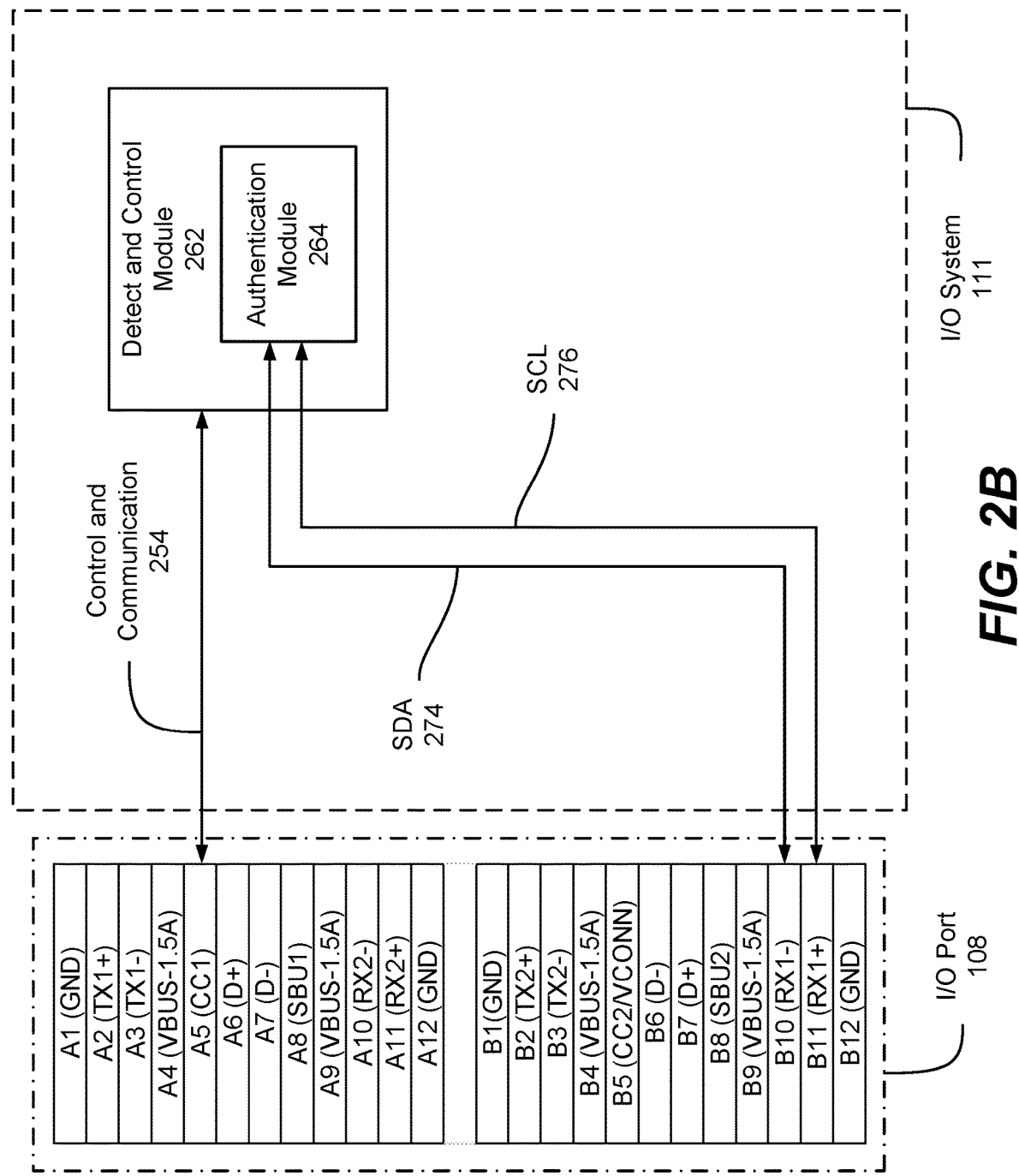
FIG. 2B is a block diagram illustrating an input/output system of a peripheral device, according to one embodiment.

In one embodiment, as illustrated in FIGS. 2A and 2B, the I/O ports 104 and 108 are Universal Serial Bus (USB) 3.X input/output (I/O) ports. The USB 3.X I/O port includes two parallel rows of pins which are referred to herein as being on a first side of the port and a second side of the I/O port. In this embodiment, the I/O ports 104 and 108 include two sets of pins: a first set of pins with a prefix "A" on the first side and a second set of pins with a prefix "B" on the second side. Table 1 summarizes the function of each pin of the I/O ports 104 and 108 according to the USB 3.X specification (USB Type-C Specification Release 1.1, p. 50).

TABLE 1

| Pin (Signal Name) | Description |
| --- | --- |
| A1 (GND) | Ground Return |
| A2 (TX1+) | Positive Half of First Differential Transmit Pair |
| A3 (TX1−) | Negative Half of First Differential Transmit Pair |
| A4 (VBUS-1.5 A) | Bus Power with 1.5 A |
| A5 (CC1) | First Configuration Channel |
| A6 (D+) | Positive Half of USB 2.0 Differential Pair |
| A7 (D−) | Negative Half of USB 2.0 Differential Pair |
| A8 (SBU1) | Sideband Use (SBU) |
| A9 (VBUS-1.5 A) | Bus Power with 1.5 A |

TABLE 1-continued

| Pin (Signal Name) | Description |
| --- | --- |
| A10 (RX2−) | Negative Half of Second Differential Receiver Pair |
| A11 (RX2+) | Positive Half of Second Differential Receiver Pair |
| A12 (GND) | Ground Return |
| B1 (GND) | Ground Return |
| B2 (TX2+) | Positive Half of Second Differential Transmit Pair |
| B3 (TX2−) | Negative Half of Second Differential Transmit Pair |
| B4 (VBUS-1.5 A) | Bus Power with 1.5 A |
| B5 (CC2/VCONN) | Second Configuration Channel/VCONN Power |
| B6 (D−) | Negative Half of USB 2.0 Differential Pair |
| B7 (D+) | Positive Half of USB 2.0 Differential Pair |
| B8 (SBU2) | Sideband Use (SBU) |
| B9 (VBUS-1.5 A) | Bus Power with 1.5 A |
| B10 (RX1−) | Negative Half of First Differential Receiver Pair |
| B11 (RX1+) | Positive Half of First Differential Receiver Pair |
| B12 (GND) | Ground Return |

FIG. 2A is a block diagram illustrating the camera 102 including the I/O system 103, the I/O port 104 and a host processor 250, according to one embodiment. The block diagram illustrates a modified USB system that enables additional communication protocols, such as an I2C protocol and a GPIO protocol, to operate over the traditional USB pins of I/O port 104. The I/O system 103 includes a detect and control module 202, a GPIO buffer 212, n I2C buffer 214, a MUX 216, and a MUX 246. Additional components of a conventional USB system and the connections to particular pins of the I/O port 104 are omitted in FIG. 2A to simplify the explanation.

The detect and control module 202 configures the I/O port 104 of the camera 102 to communicate with a peripheral device (e.g., the peripheral device 110). The detect and control module 202 receives and processes a control and communication bus 244, synchronization signals 222 and 224, a serial data line (SDA) 226 and a serial clock line (SCL) 228 and outputs an I2C bus 236, an interrupt signal 238, a MUX control signal 234 and a MUX control signal 232. The detect and control module 202 includes an authentication module 204.

As will be described in further detail below, the authentication module 204 performs authentication between the camera 102 and the peripheral device 110 via an I2C protocol to determine if peripheral device 110 meets a specified criteria for an approved device. The I2C protocol is an industry standard for communication between components either on a single board or across multiple boards linked via a cable. Particularly, the authentication module 204 performs the authentication by transmitting authentication data via a SDA 226 and a SCL 228 to the I2C buffer 214. The authentication module 204 also receives processed authentication data from the I2C buffer 214 via SDA 226 and SCL 228. The authentication module 204 determines whether or not the peripheral device 110 meets the specified criteria for an approved device based on the received processed authentication data.

The detect and control module 202 furthermore communicates with the host processor 250 over I2C bus 236. The bidirectional I2C bus 236 includes two bidirectional signals, a serial data line (SDA) (not shown) and a serial clock line (SCL) (not shown separately). The detect and control module 202 transmits information to the host processor 250 over the I2C bus 236 including peripheral device identifier, result of an authentication between the camera 102 and the peripheral device 110, telemetry data, etc. The detect and control module 202 further outputs an interrupt signal 238. The detect and control module 202 interrupts the host processor 250 using the interrupt signal 238 when an event occurs at the I/O system 103. Examples of events during which the detect and control module 202 interrupts the host processor 250 includes a peripheral device (e.g., the peripheral device 110) connecting/disconnecting from the I/O port 104 of the camera 102, or if a peripheral device (e.g., the peripheral device 110) transmits a command to wake the host processor 250 of the camera 102.

The I2C buffer 214 operates according to the MUX control signal 232. The I2C buffer 214 operates as a switch located between the I/O system 103 and pins B10 (RX1−) and B11 (RX1_) of the I/O Port 104. The I2C buffer 214 disables/enables communication, specifically via pins B10 and B11 of the I/O port 104, between the I/O system 103 and a peripheral device (e.g., the peripheral device 110) connected to the camera 102 via the I/O port 104. When in an off state, the I2C buffer 214 disconnects the I/O system 103 from pins B10 and B11 of the I/O port 104. When in an on state, the I2C buffer 214 connects the I/O system 103 to pins B10 and B11 of the I/O port 104. The I2C buffer 214 switches from the off state to an on state if the detect and control module 202 determines, based on the control and communication bus 244, a peripheral device (e.g., the peripheral device 110) connected to the camera 102 via the I/O port 104 is a non-USB3 device.

The GPIO buffer 212 operates according to the MUX control signal 232. The GPIO buffer 212 operates as a switch located between the I/O system 103 and pins B2 (TX2+) and B3 (TX2−) of the I/O port 104. The GPIO buffer 212 disables/enables communication, specifically via pins B2 and B3 of the I/O port 104, between the I/O system 103 and a peripheral device (e.g., the peripheral device 110) connected to the camera 102 via the I/O port 104. When in an off state, the GPIO buffer 212 disconnects the I/O system 103 from pins B2 and B3 of the I/O port 104. When in an on state, the GPIO buffer 212 connects the I/O system 103 to pins B2 and B3 of the I/O port 104. The GPIO buffer 212 switches from the off state to the on state if a peripheral device (e.g., peripheral device 110) passes authentication.

The MUX 216 multiplexes pin B8 (SBU2) of the I/O port 104 between a default sideband use 2 (SBU2) function and a custom defined function. For example, the custom defined function can output a composite (CVBS) analog video or an analog microphone signal over pin B8 of the I/O Port 104.

The MUX 246 multiplexes pins B6 (D−) and B7 (D+) of the I/O port 104 between multiple functions. Examples of the multiple functions include analog audio line-in, analog audio line-out, or digital audio over the Serial Low-power inter-chip Media Bus (SLIMBus$^{SM}$) interface.

The camera 102 includes, among other components, the host processor 250. In one embodiment, the host processor 250 is a system on chip (SoC) component. The host processor 250 communicates with detect and control module 202 over I2C bus 236 and interrupt signal 238.

FIG. 2B is a block diagram illustrating the I/O system 111 and the I/O port 108 of the peripheral device 110, according to one embodiment. The I/O system 111 includes a detect and control module 262. Additional components of a conventional USB system and connections to particular pins of the I/O port 108 are omitted in FIG. 2B to simplify the explanation.

The detect and control module 262 configures the I/O port 108 to communicate with a camera (e.g., the camera 102). Particularly, the detect and control module 262 transmits an identifier via the control and communication bus 254 indicating the peripheral device 110 is non-USB3 device. The peripheral device 110 can then communicate with I/O System 103 inside a camera over I2C for Device Authentication and other special functions for example Telemetry data transfer.

The detect and control module 262 includes an authentication module 264. The authentication module 264 performs authentication between the peripheral device 110 and the camera 102. The authentication module 264 receives authentication data via the I/O port 108. The authentication module 264 processes the authentication data and transmits the processed authentication data via the I/O port 108.

Figure 3:
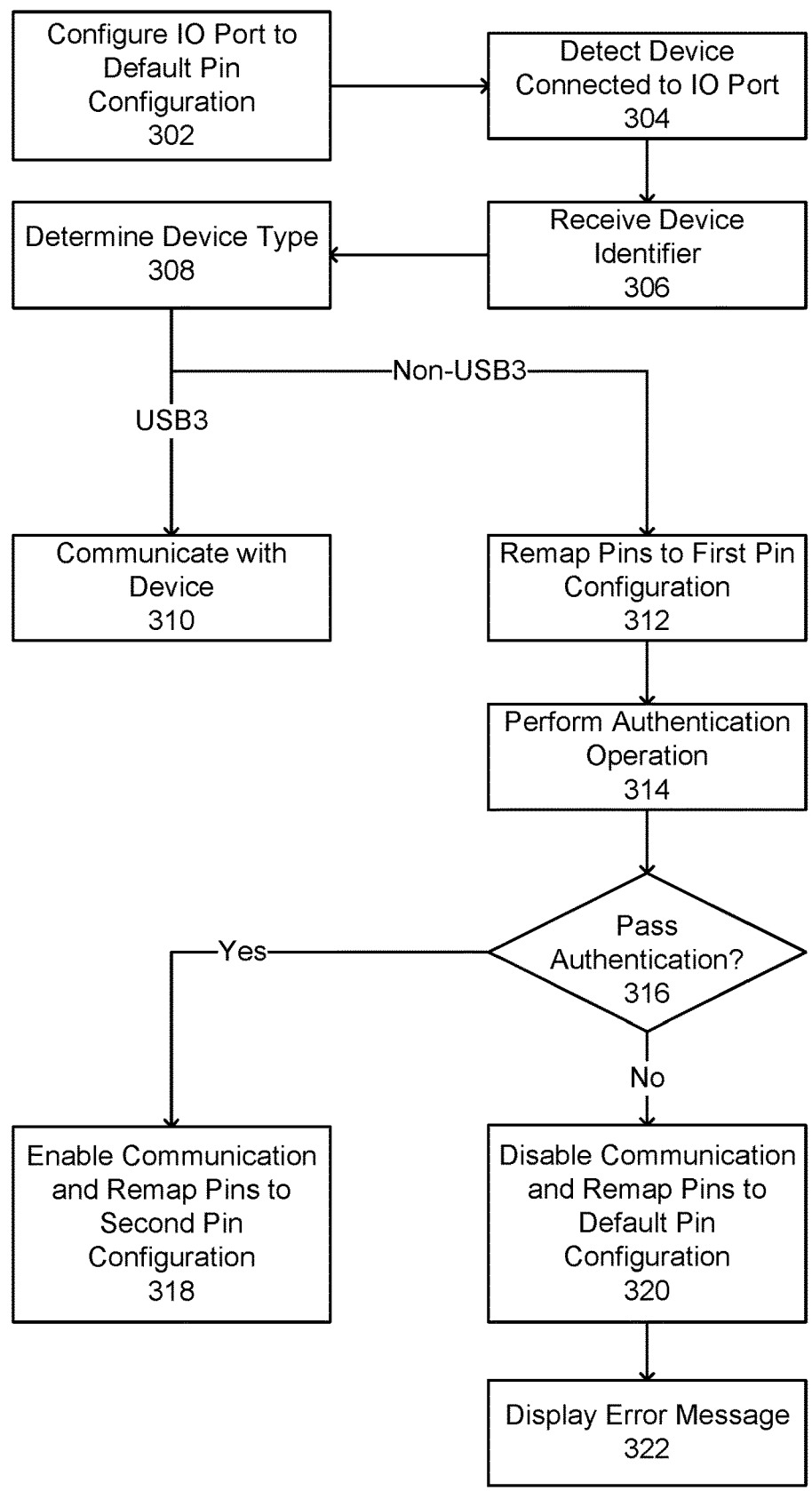
FIG. 3 is a flow chart of a method for configuring a Universal Serial Bus (USB) 3.X input/output port in a camera, according to one embodiment.

FIG. 3 illustrates a flow chart of a method for configuring the I/O port 104 of the camera 102, according to one embodiment. In this embodiment, the I/O port 104 is a USB3 port. The detect and control module 202 of the I/O system 103 configures 302 the I/O port 104 to a default pin configuration. In the default pin configuration, the pins of the I/O port 104 are configured 302 for default USB3 operation.

The detect and control module 202 detects 304 the peripheral device 110 is connected to the camera 102 via the I/O port 104. After the peripheral device 110 is connected, the detect and control module 202 receives 306 a device identifier from the peripheral device 110 via a USB3 protocol. In one embodiment, the detect and control module 202 receives 306 the device identifier via the control and communication bus 244. The device identifier indicates whether the peripheral device 110 is a USB3 device or a non-USB3 device. The detect and control module 202 determines 308 the device type (i.e., whether the peripheral device 100 is a USB3 device or a non-USB3 device).

If the detect and control module 202 determines 308, based on the control and communication bus 244, the peripheral device 110 is a USB3 device, the I/O port 104 remains in the default pin configuration and the detect and control module 202 communicates 310 with the peripheral device 110 via the USB3 protocol.

If the detect and control module 202 determines 308, based on the control and communication bus 244, the peripheral device 110 is non-USB3 device, the detect and control module 202 remaps 312 the pins of the I/O port 104 to a first predefined pin configuration, which includes switching the I2C Buffer 214 from the off state to the on state for device authentication.

In one embodiment, remapping 312 the pins of the I/O port 104 to the first predefined pin configuration includes remapping 312 the positive and negative halves of the first differential receiver pair, B10 (RX1−) and B11 (RX1+) of the I/O port 104. Specifically, the RX1− pin is remapped 312 to communicate a first I2C signal and the RX1+ pin is remapped 312 to communicate a second I2C signal. The first I2C signal can be a serial data line (SDA) and the second I2C signal can be a serial clock line (SCL).

While the pins are in the first predefined pin configuration, the authentication module 204 performs 314 authentication between the camera 102 and the peripheral device 110 via the I2C protocol. The authentication is performed to determine if the peripheral device 110 meets a specified criteria for an approved device.

In one embodiment, the authentication module 204 performs 314 authentication by transmitting authentication data via a SDA 226 and a SCL 228 to the I2C buffer 214. The I2C buffer 214 receives the authentication data via SDA 226 and SCL 228 and transmits the authentication data to the peripheral device 110 via the RX1− and RX1+ pins of the I/O port 104. The I2C buffer 214 receives processed authentication data from the peripheral device 110 via the RX1− and RX1+ pins of the I/O port 104 and transmits the processed authentication data to the authentication module 204 via SDA 226 and SCL 227. The authentication module 204 processes the received authentication data and indicates whether the peripheral device 110 passes 316 authentication.

If the peripheral device 110 passes 316 authentication (i.e., authentication is successful), the detect and control module 202 enables 318 further communication with the peripheral device 110 and remaps 318 the pins of the I/O port 104 to a second predefined port configuration compatible with the operation of the peripheral device 110, which includes switching the GPIO buffer 212 from the off state to the on state. For example, the detect and control module 202 enables communication via the control and communication bus 244 and communicates with the peripheral device 110 via GPIO buffer 212.

In one embodiment, remapping 318 the pins of the I/O port 104 to the second predefined pin configuration includes remapping 318 the positive and negative halves of the second differential transmit pair, B2 (TX2+) and B3 (TX2−) of the I/O port 104.

In one embodiment, in remapping 318 the pins to the second predefined port configuration, the GPIO buffer 212 communicates general purpose input/output signals between the camera 102 and the peripheral device 110. Specifically, the TX2+ pin communicates a first general purpose input/output signal and the TX2− pin communicates a second general purpose input/output signal.

According to another embodiment, in remapping 318 the pins to the second predefined port configuration, the GPIO buffer 212 communicates horizontal synchronization (HSYNC) signals 222 and vertical synchronization (VSYNC) signals 224 between the camera 102 and the peripheral device 110. The HSYNC signals 222 and the VSYNC signals 224 include position, polarity, and duration information. The HSYNC signal 222 indicates the beginning of each video line and the VSYNC signal 224 indicates to perform a vertical retrace and prepare to scan the next video frame. The TX2+ pin communicates the HSYNC signal 222 and the TX2− pin communicates the VSYNC signal 224. For example, the HSYNC signals 222 and the VSYNC signals 224 are used for timing synchronization between multiple cameras during multi-camera video capture.

According to yet another embodiment, in remapping 318 the pins to the second predefined port configuration, the MUX 246 communicates audio compatible signals between the camera 102 and the peripheral device 110. Specifically, remapping 318 the pins of the I/O port 104 to the second predefined pin configuration includes remapping 318 the negative and positive halves of the USB 2.0 differential pair, B6 (D−) and B7 (D+) of the I/O port 104. The D− pin communicates a first audio compatible signal and the D+ pin communicates a second audio compatible signal. In one embodiment, the audio compatible signals are SLIMbus$^{SM}$ compatible signals.

If the peripheral device 110 does not pass 316 authentication, the detect and control module 202 disables 320 communication with the peripheral device 110 and remaps 320 the pins of the I/O port 104 to the default USB3 pin configuration. The camera 102 displays 322 an error message on the camera 102 indicating the peripheral device 110 cannot be authenticated.

Example Camera System Configuration

Figure 4:
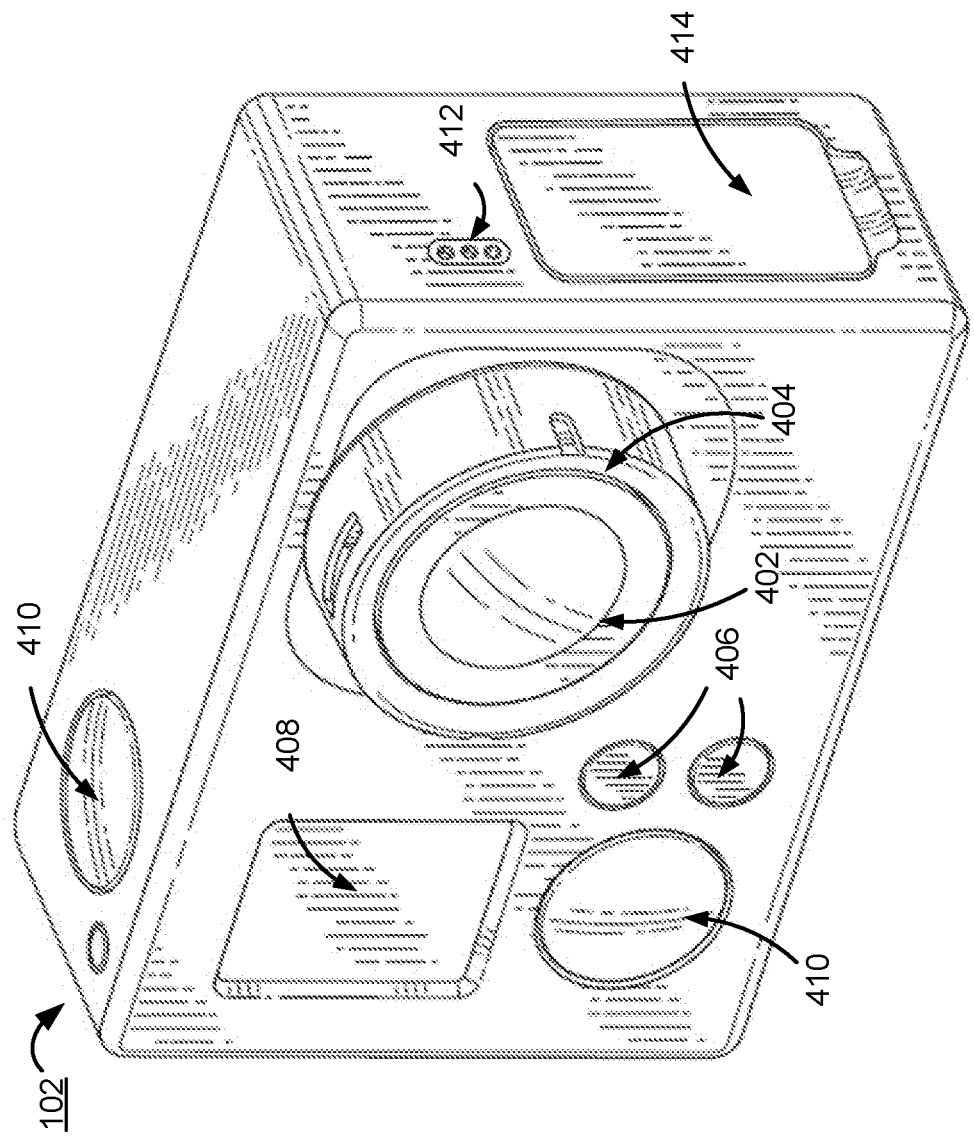
FIG. 4 is a block diagram illustrating a camera, according to one embodiment.

FIG. 4 illustrates an embodiment of an example camera 102 described above. The camera 102 includes a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera 102 is configured to capture images and video, and to store captured images and video for subsequent display or playback. As illustrated, the camera 102 includes a lens 402 configured to receive light incident upon the lens and to direct received light onto an image sensor internal to the lens. The lens 402 is enclosed by a lens ring 404.

The camera 102 can include various indicators, including the LED lights 406 and the LED display 408. The camera 102 can also include buttons 410 configured to allow a user of the camera to interact with the camera, to turn the camera on, and to otherwise configure the operating mode of the camera. The camera 102 can also include a microphone 412 configured to receive and record audio signals in conjunction with recording video. The camera 102 includes an I/O interface 104 (not illustrated in FIG. 4).

Additional Configuration Considerations

Certain embodiments are described herein as including logic or a number of components, modules, or mechanisms, for example, as illustrated in FIGS. 2A and 2B. Modules may constitute either software modules (e.g., code embodied on a machine-readable medium) or hardware modules. A hardware module is tangible unit capable of performing certain operations and may be configured or arranged in a certain manner. In example embodiments, one or more computing devices may include one or more hardware modules for implementing the operations described herein. For software modules, the modules may be embodied as instructions stored to a non-transitory computer-readable storage medium that when executed by a processor causes the processor to carry out functions attributed to the modules described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The hardware or software modules may also operate to support performance of the relevant operations in a "cloud computing" environment or as a "software as a service" (SaaS). For example, at least some of the operations may be performed by a group of computing devices, these operations being accessible via a network (e.g., the Internet) and via one or more appropriate interfaces (e.g., application program interfaces (APIs)). The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for configuring a USB3 input/output port in a camera, the method comprising:
   responsive to an indication that a peripheral device is a non-USB3 device, remapping pins of the USB3 input/output port to a first predefined port configuration associated with a protocol by remapping a first pin to communicate a first signal and remapping a second pin to communicate a second signal; and
   responsive to successful authentication between the camera and the peripheral device via the protocol, enabling communication with the peripheral device and remapping the pins of the USB3 input/output port to a second predefined port configuration compatible with operation of the peripheral device by remapping a third pin to communicate a first general purpose input/output signal and remapping a fourth pin to communicate a second general purpose input/output signal.

2. The method of claim 1, further comprising:
   responsive to unsuccessful authentication between the camera and the peripheral device via the protocol, displaying an error message on the camera indicating that the peripheral device cannot be authenticated.

3. The method of claim 1, wherein remapping the pins of the USB3 input/output port to the second predefined port configuration compatible with operation of the peripheral device further comprises:
   remapping the pins to communicate horizontal and vertical synchronization signals between the camera and the peripheral device.

4. The method of claim 3, wherein remapping the pins to communicate the horizontal and vertical synchronization signals further comprises:
   remapping a TX2+ pin to communicate a horizontal synchronization signal; and
   remapping a TX2− pin to communicate a vertical synchronization signal.

5. The method of claim 1, wherein remapping the pins of the USB3 input/output port to the second predefined port configuration compatible with operation of the peripheral device further comprises:
   remapping the pins to communicate general purpose input/output signals between the camera and the peripheral device.

6. The method of claim 1, wherein remapping the pins of the USB3 input/output port to the second predefined port configuration compatible with operation of the peripheral device further comprises:
   remapping the pins to communicate audio compatible signals between the camera and the peripheral device.

7. The method of claim 6, wherein remapping the pins to communicate the audio compatible signals further comprises:
   remapping a D− pin to communicate a first audio compatible signal; and
   remapping a D+ pin to communicate a second audio compatible signal.

8. A non-transitory computer readable storage medium having instructions executed thereon that, when executed by a processor, causes the processor to:
   responsive to an indication that a peripheral device is a non-USB3 device, remap pins of a USB3 input/output port in a camera to a first predefined port configuration associated with an I2C protocol by remapping a first pin to communicate a first I2C signal and remapping a second pin to communicate a second I2C signal; and
   responsive to successful authentication between the camera and the peripheral device via the I2C protocol, enable communication with the peripheral device and remap the pins of the USB3 input/output port to a second predefined port configuration compatible with operation of the peripheral device by remapping a third pin to communicate a first general purpose input/output signal and remapping a fourth pin to communicate a second general purpose input/output signal.

9. The non-transitory computer readable storage medium of claim 8, further comprising instructions that, when executed, cause the processor to:
   responsive to an unsuccessful authentication between the camera and the peripheral device via the I2C protocol, display an error message on the camera indicating that the peripheral device cannot be authenticated.

10. The non-transitory computer readable storage medium of claim 8, wherein to remap the pins of the USB3 input/output port to the second predefined port configuration compatible with operation of the peripheral device further comprises to:
   remap the pins to communicate horizontal and vertical synchronization signals between the camera and the peripheral device.

11. The non-transitory computer readable storage medium of claim 10, wherein to remap the pins to communicate the horizontal and vertical synchronization signals further comprises to:
   remap a TX2+ pin to communicate a horizontal synchronization signal; and
   remap a TX2− pin to communicate a vertical synchronization signal.

12. The non-transitory computer readable storage medium of claim 8, wherein to remap the pins of the USB3 input/output port to the second predefined port configuration compatible with operation of the peripheral device further comprises to:
   remap the pins to communicate general purpose input/output signals between the camera and the peripheral device.

13. The non-transitory computer readable storage medium of claim 8, wherein to remap the pins of the USB3 input/output port to the second predefined port configuration compatible with operation of the peripheral device further comprises to:
   remap the pins to communicate audio compatible signals between the camera and the peripheral device.

14. The non-transitory computer readable storage medium of claim 13, wherein to remap the pins to communicate the audio compatible signals further comprises to:
   remap a D− pin to communicate a first audio compatible signal; and
   remap a D+ pin to communicate a second audio compatible signal.

15. A camera, comprising:
   a USB3 input/output port;
   a processor; and
   a memory, storing an application that when executed by the processor, causes the processor to:
   responsive to an indication that a peripheral device is a non-USB3 device, remap pins of the USB3 input/output port to a first predefined port configuration by remapping a first pin to communicate a first signal and remapping a second pin to communicate a second signal; and
   responsive to successful authentication between the camera and the peripheral device, enable communication with the peripheral device and remap the pins of the USB3 input/output port to a second predefined port configuration compatible with operation of the peripheral device by remapping a third pin to communicate a third signal and remapping a fourth pin to communicate a fourth signal.

16. The camera of claim 15, execution of the application further causing the processor to:
   responsive to an unsuccessful authentication between the camera and the peripheral device, display an error message on the camera indicating that the peripheral device cannot be authenticated.

17. The camera of claim 15, wherein to remap the pins of the USB3 input/output port to the second predefined port configuration compatible with operation of the peripheral device further comprises to:
   remap the pins to communicate horizontal and vertical synchronization signals between the camera and the peripheral device.

18. The camera of claim 17, wherein to remap the pins to communicate the horizontal and vertical synchronization signals further comprises to:
- remap a TX2+ pin to communicate a horizontal synchronization signal; and
- remap a TX2− pin to communicate a vertical synchronization signal.

19. The camera of claim 15, wherein to remap the pins of the USB3 input/output port to the second predefined port configuration compatible with operation of the peripheral device further comprises to:
- remap the pins to communicate general purpose input/output signals between the camera and the peripheral device.

20. The camera of claim 15, wherein to remap the pins of the USB3 input/output port to the second predefined port configuration compatible with operation of the peripheral device further comprises to:
- remap the pins to communicate audio compatible signals between the camera and the peripheral device.

* * * * *